(12) United States Patent
Putrevu et al.

(10) Patent No.: US 11,803,894 B2
(45) Date of Patent: Oct. 31, 2023

(54) ALLOCATING SHOPPERS AND ORDERS FOR FULFILLMENT BY AN ONLINE CONCIERGE SYSTEM TO ACCOUNT FOR VARIABLE NUMBERS OF SHOPPERS ACROSS DIFFERENT TIME WINDOWS

(71) Applicant: Maplebear, Inc., San Francisco, CA (US)

(72) Inventors: Jagannath Putrevu, San Francisco, CA (US); Zi Wang, Mountain View, CA (US); Site Wang, San Francisco, CA (US); Houtao Deng, Sunnyvale, CA (US); Yijia Chen, Oakland, CA (US); Mingzhe Zhuang, Los Altos Hills, CA (US); Ji Chen, Mountain View, CA (US); Deepak Tirumalasetty, Castro Valley, CA (US)

(73) Assignee: Maplebear Inc., San Francisco, CA (US)

( * ) Notice: Subject to any disclaimer, the term of this patent is extended or adjusted under 35 U.S.C. 154(b) by 276 days.

(21) Appl. No.: 17/202,190

(22) Filed: Mar. 15, 2021

(65) Prior Publication Data
US 2022/0292580 A1    Sep. 15, 2022

(51) Int. Cl.
| | | |
|---|---|---|
| *G06Q 30/00* | (2023.01) | |
| *G06Q 30/0601* | (2023.01) | |
| *G06Q 10/0631* | (2023.01) | |
| *G06Q 10/087* | (2023.01) | |
| *G06Q 30/0283* | (2023.01) | |

(52) U.S. Cl.
CPC .... *G06Q 30/0635* (2013.01); *G06Q 10/06313* (2013.01); *G06Q 10/06315* (2013.01); *G06Q 10/087* (2013.01); *G06Q 30/0284* (2013.01)

(58) Field of Classification Search
CPC ....... G06Q 30/06–08; G06Q 10/06313; G06Q 10/06315; G06Q 10/087
See application file for complete search history.

(56) References Cited

U.S. PATENT DOCUMENTS 10,769,588 B1 *  9/2020  Kim ............... H04N 21/812
2014/0310196 A1 * 10/2014  Yamamura ....... G06Q 10/083
                                                       705/337

* cited by examiner

*Primary Examiner* — Ethan D Civan
(74) *Attorney, Agent, or Firm* — Fenwick & West LLP (57) ABSTRACT

An online concierge system allows users to order items within discrete time intervals later than a time when an order was received. The online concierge system allocates a specified percentage of an estimated number of shoppers during a discrete time interval to fulfilling orders received before the discrete time interval. An order may include a flag authorizing flexible fulfillment of the order along with a discrete time interval, which allows the order to be fulfilled earlier than the identified discrete time interval. The online concierge system generates groups of multiple orders authorizing flexible fulfillment and determines a cost for fulfilling different groups of orders. The online concierge system identifies a group of orders authorizing flexible fulfillment having a minimum cost for fulfillment by a shopper, allowing for more allocation of shoppers by enabling grouping of orders identifying different discrete time intervals.

21 Claims, 6 Drawing Sheets

ALLOCATING SHOPPERS AND ORDERS FOR FULFILLMENT BY AN ONLINE CONCIERGE SYSTEM TO ACCOUNT FOR VARIABLE NUMBERS OF SHOPPERS ACROSS DIFFERENT TIME WINDOWS

BACKGROUND

This disclosure relates generally to ordering items through an online concierge system, and more specifically to allocation of shoppers and grouping of orders based on varying numbers of shoppers and orders across different time windows.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Conventional online concierge systems maintain discrete time windows during which orders are fulfilled, and a user selects a specific time window for an order to be fulfilled and delivered to the user. For example, a user selects a time window corresponding to a specific range of times to schedule an order for fulfillment in the future or selects a time window that is an amount of time from a time when the order is placed for the order to be fulfilled as soon as possible. This allows users of an online concierge system to select a specific window for receiving items from an order or to obtain the items in an order within a specified time interval from a time when the order is placed.

To fulfill orders received from users, the online concierge system estimates numbers of shoppers available for fulfilling orders during different time intervals and allocates a specific amount of the estimated number of shoppers as available to fulfill orders. The specific amount of the estimated shoppers available to fulfill orders during a time window is often less than the total number of estimated number of shoppers available to fulfill orders, allowing an online concierge system to maintain a reserve amount of estimated shoppers for fulfilling orders in real-time within the specified time interval of times when the order is placed. While allocating a specific amount of an estimated number of shoppers for fulfilling orders scheduled for specific time windows allows the online concierge system to maintain resources to more rapidly fulfill short-term orders, significant increases in numbers of orders to be fulfilled occupies the specific amount or estimated shoppers available during multiple time windows, limiting time windows during which users may schedule orders for fulfillment. The amount of estimated shoppers available for fulfilling orders within the specific time window of times when the orders are received allows the online concierge system to receive some orders from users, but significant increases in order volume may quickly occupy the amount of estimated shoppers for fulfilling orders within the specific time window of times when the orders are received. Such intermittent availability of shoppers and times for order fulfillment decreases likelihoods of users subsequently placing orders through the online concierge system.

SUMMARY

An online concierge system maintains a plurality of discrete time intervals during which orders received by the online concierge system are fulfilled. For example, the online concierge system maintains multiple two-hour intervals during a day or another duration for fulfilling orders. This allows a user of the online concierge system to select a discrete time interval for an order provided by the user so that items included in the order are delivered to the user at a time within the selected discrete time interval. By selecting a discrete time interval, a user of the online concierge system can schedule delivery of items in the order at a future time within the selected discrete time interval, allowing the user to tailor when the order is fulfilled. In some embodiments, the online concierge system maintains a maximum interval and allows a user to select a discrete time interval that is within the maximum interval from a time when the order is received by the online concierge system to limit how long in the future the user may schedule fulfillment of the order.

From previously fulfilled orders, the online concierge system determines an estimated number of shoppers available to fulfill orders during each of at least a set of the discrete time intervals. For example, the online concierge system determines an estimated number of shoppers available to fulfill orders during each of the discrete time intervals. In various embodiments, the online concierge system applies a trained machine learned model to historical numbers of shoppers available to fulfill orders, or who fulfilled orders, at different discrete time intervals and characteristics of the discrete time interval (e.g., weekday or weekend, time of day, day of the week, day of the month, etc.), as well as a geographic location. To determine the estimated number of shoppers, the trained machine learned model receives a discrete time interval and a geographic location and determines the estimated number of shoppers available to fulfill orders during the discrete time interval based on historical numbers of shoppers available during prior time intervals corresponding to the discrete time interval, as well as the geographic location. The trained machine learned model for determining the estimated number of shoppers during a discrete time interval may be trained using any suitable method or combination of methods (e.g., supervised learning, unsupervised learning, semi-supervised learning, etc.). In various embodiments, the online concierge system determines an estimated number of shoppers available to fulfill orders during each discrete time interval of a set. For example, the set of discrete time intervals includes each discrete time interval within the maximum interval from a current time.

The online concierge system maintains a specified percentage of shoppers to allocate per discrete time interval for fulfilling orders. Based on the specified percentage, the online concierge system allocates the specified percentage of estimated shoppers for a discrete time interval for fulfilling orders specifying the discrete time interval. The specified percentage of estimated shoppers for a discrete time interval for fulfilling orders specifying the discrete time interval is less than 100%, with the remaining percentage of the estimated shoppers for the discrete time interval are allocated by the online concierge system for fulfilling orders received during the discrete time interval and indicating short term fulfillment (i.e., fulfillment within a threshold amount of time from a time when the order was received). This allocation allows the online concierge system to divide the number of estimated shoppers during the discrete time interval between orders received before the discrete time interval that specify fulfillment during the discrete time interval and orders received during the discrete time interval identifying short term fulfillment for fulfillment.

This allocation of estimated shoppers for fulfilling orders during discrete time intervals between orders received before a discrete time interval and specifying the discrete time interval and orders received during the discrete time interval allows the online concierge system to maintain a buffer of estimated shoppers for fulfilling orders received to during the discrete time interval or to account for increases in orders identifying the discrete time interval for fulfillment. However, when numbers of orders increase, because the specified percentage is less than 100% of the estimated shoppers for fulfilling orders during different discrete time intervals, discrete time intervals capable of being specified by orders from users decrease, making scheduling of order fulfillment difficult for users. Further, increasing numbers of orders may increase a number of orders received during a discrete time interval, quickly occupying remaining shoppers for fulfilling orders received during the discrete time interval. This may cause intermittent availability of users to place orders to be fulfilled within the maximum interval from the time when the online concierge system receives the orders.

To improve order fulfillment, the online concierge system allows a user to include a flag in an order authorizing flexible fulfillment of the order. Including the flag in the order authorizes the online concierge system to deliver items included in the order at any time prior to a discrete time interval identified by the order. Hence, the flag allows the user to identify a discrete time interval, while allowing the online concierge system to fulfill and deliver items in the order during other discrete time intervals that are earlier than the discrete time interval. This causes the discrete time interval identified by the order to specify a latest time interval for delivery of items included in the order.

When the online concierge system receives an order from a user that identifies a discrete time interval that is later than a time when the order was received and that includes the flag authorizing flexible fulfillment of the order, the online concierge system determines whether one or more shoppers are available to fulfill orders during one or more discrete time intervals that are earlier than the discrete time interval identified by the order. Responsive to determining one or more shoppers are available to fulfill orders during one or more discrete time intervals earlier than the discrete time interval identified by the order, the online concierge system evaluates the order including the flag authorizing flexible fulfillment and other orders with the flag authorizing flexible fulfillment. The online concierge system retrieves additional orders received by the online concierge system that also include the flag authorizing flexible fulfillment.

When retrieving additional orders including the flag authorizing flexible fulfillment, the online concierge system limits retrieval to additional orders including the flag authorizing flexible satisfying one or more criteria in some embodiments. For example, the online concierge system retrieves additional orders including the flag authorizing flexible fulfillment identifying locations within a threshold distance of the location identified by the received order including the flag authorizing flexible fulfillment. In some embodiments, the online concierge system maintains regions including multiple geographic locations, so the online concierge system retrieves additional orders including the flag authorizing flexible fulfillment including locations within a region including a geographic location included in the received order including the flag authorizing flexible fulfillment. As another example, the online concierge system also accounts for discrete time intervals identified by additional orders including the flag authorizing flexible fulfillment by retrieving additional orders including the flag authorizing flexible fulfillment that identify discrete time intervals not later than the discrete time interval identified by the received order including the flag authorizing flexible fulfillment. Hence, in some embodiments, the online concierge system retrieves additional orders including the flag authorizing flexible fulfillment that identify discrete time intervals not later than the discrete time interval identified by the received order including the flag authorizing flexible fulfillment as well as that identify geographic locations within a threshold distance of geographic location identified by the received order including the flag authorizing flexible fulfillment (or including geographic locations within a common region of geographic locations as the received order including the flag authorizing flexible fulfillment).

From the order including the flag authorizing flexible fulfillment and the one or more additional orders including the flag authorizing flexible fulfillment, the online concierge system generates a set of candidate groups each including different combinations of the order including the flag authorizing flexible fulfillment and the one or more additional orders including the flag authorizing flexible fulfillment. In some embodiments, the set includes each potential combination of the order including the flag authorizing flexible fulfillment and the one or more additional orders including the flag authorizing flexible fulfillment. In some embodiments, the online concierge system generates the set of candidate groups, so candidate groups satisfy one or more constraints maintained by the online concierge system. For example, the online concierge system may limit combinations of the received order including the flag authorizing flexible fulfillment and additional orders including the flag authorizing flexible fulfillment to combinations including less than a threshold number of orders. As another example, the online concierge system limits combinations of the received order including the flag authorizing flexible fulfillment and additional orders including the flag authorizing flexible fulfillment to combinations where a total number of items in orders included in a combination is less than a maximum number of items.

For each candidate group, the online concierge system determines a cost for a shopper fulfilling orders included in a candidate group. The online concierge system applies a machine learned cost model to a candidate group to determine a cost for fulfilling orders in the candidate group based on locations identified by orders in the candidate group and items included in orders in the candidate group. The machine learned cost model outputs a cost accounting for an estimated distance (e.g., an estimated mileage) for a shopper to travel to fulfill the orders in the candidate group and an estimated amount of time for the shopper to retrieve items from one or more warehouses identified by orders of the group. The machine learned cost model estimates the amount of time for the shopper to retrieve items from a warehouse identified by an order of the group based on a number of items in the order, characteristics of items in the order, a time during which the items of the order are obtained from the warehouse, historical times to obtain items from the warehouse, and any other suitable criteria. Similarly, the machine learned cost model estimates the distance travelled to fulfill orders of the candidate group (e.g., distances between warehouses identified by orders in the group, distances between one or more warehouses identified by orders of the group and locations identified by orders of the group) based on locations of warehouses included in the orders of the candidate groups and locations identified by orders of the candidate group. In some embodiments, the machine learned cost model determines a time to deliver orders of the candidate group based on locations of warehouses included in the orders of the candidate groups, locations identified by orders of the candidate group, a time when the orders of the candidate group are to be delivered, prior times to deliver orders from the warehouses included in the orders to locations within a threshold distance of the locations identified by orders of the candidate group, prior times to travel between warehouses identified by orders of the group, and may account for traffic conditions at the time when the orders of the candidate group are to be delivered, as well as any other suitable criteria. The machine learned cost model may be trained using any suitable method or combination of methods (e.g., supervised learning, unsupervised learning, semi-supervised learning, etc.) in various embodiments.

As the costs determined for each candidate group account for time to fulfill orders of the candidate group and distance traveled to fulfill orders of the candidate group, the online concierge system selects a candidate group of the set having a minimum cost. This allows the online concierge system to identify a group of orders for a shopper to fulfill having the lowest overall cost to fulfill as a group. Accounting for orders including the flag specifying flexible fulfillment that specify different discrete time intervals before the time interval identified by the received order including the flag specifying flexible fulfillment allows the online concierge system to consider a broader range of orders for inclusion in a group, increasing an ability of the online concierge system to combine orders into a group. This provides the online concierge system with greater opportunities to combine orders for fulfillment as a group to conserve resources for order fulfillment, while providing users with greater opportunities for order fulfillment. The online concierge system identifies the selected candidate group of the set to one or more shoppers, allowing a shopper to select the selected candidate group of orders for fulfillment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
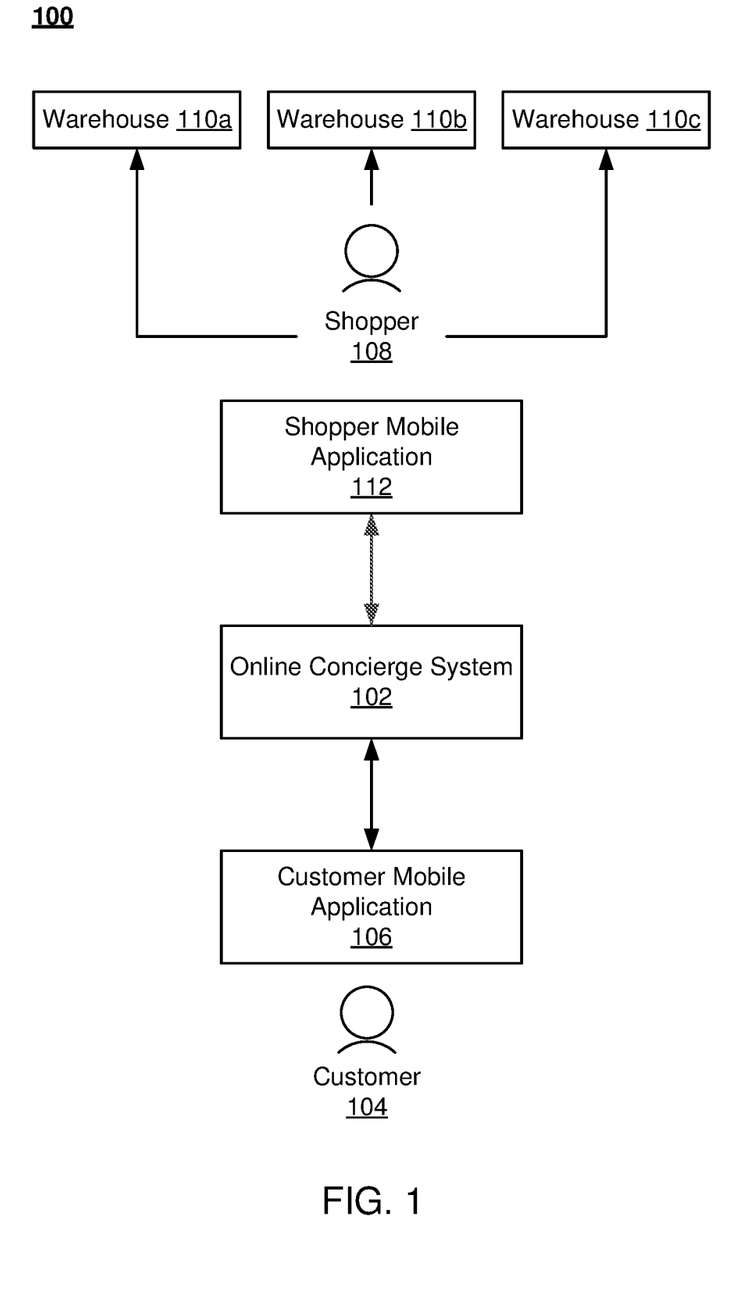
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
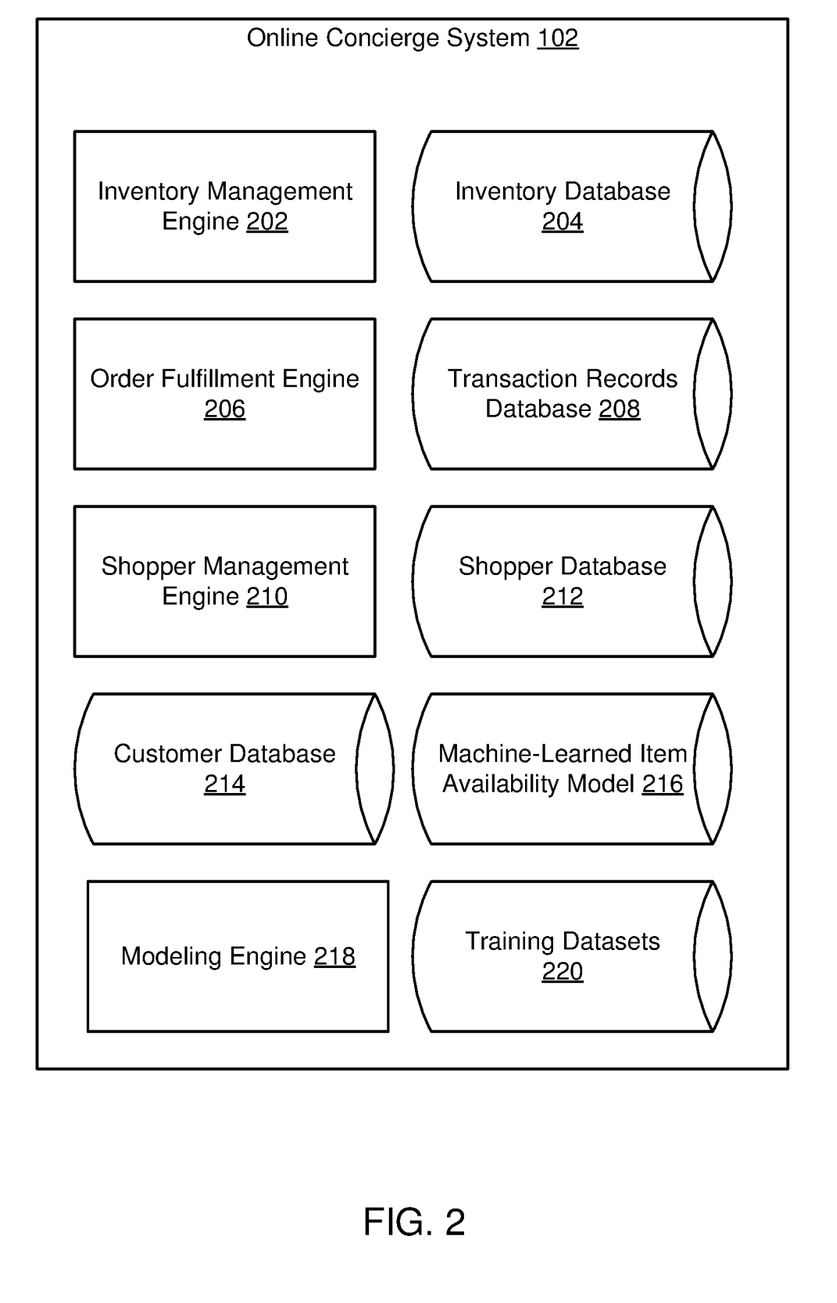
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse 110 to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on. Methods that can be used to identify a warehouse 110 at which a shopper 108 can likely find most or all items in an order are described with respect to FIG. 4.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 selects a group of orders, allowing a shopper to choose to fulfill each of the orders included in the group. In various embodiments, the order fulfillment engine 206 maintains discrete time intervals for fulfilling orders and a user identifies a discrete time interval in an order, allowing the user to specify a time window when items from the order are delivered to the user. To allow the order fulfillment engine 206 or the shopper management engine 210 greater flexibility in shoppers capable of fulfilling an order, a user may include a flag authorizing flexible fulfillment as well as identifying a discrete time interval. The flag authorizing flexible fulfillment allows items from the order to be delivered at any time between a time when the online concierge system 102 received the order and the discrete time interval identified by the order. As further described below in conjunction with FIG. 5, the order fulfillment engine 206 or the shopper management engine 210 allocates a specified percentage of shoppers estimated to be available during a discrete time interval or available during a discrete time interval for fulfilling previously received orders identifying the discrete time interval. The specified percentage is less than 100%, allowing the order fulfillment engine 206 or the shopper management engine 210 to maintain a reserve of shoppers who are not allocated for fulfilling previously received orders identifying a discrete time interval.

The flag authorizing flexible delivery in an order allows shoppers who are not allocated for fulfilling previously received orders identifying discrete time intervals earlier than a discrete time interval identified by the order to select and fulfill the order before the discrete time interval identified by the order. As further described below in conjunction with FIGS. 5 and 6, the order fulfillment engine 206 further increases order fulfillment efficiency by generating groups of orders authorizing flexible delivery so a shopper selecting a group fulfills the orders in the group. The order fulfillment engine 206 applies a machine learned cost model to various groups including orders authorizing flexible fulfillment to determine a cost for fulfilling orders in the candidate group based on locations identified by orders in the group and items included in orders in the group. The cost for a group accounts for an estimated distance (e.g., an estimated mileage) for a shopper to travel to fulfill the orders in the group and an estimated amount of time for the shopper to retrieve items from one or more warehouses 110 identified by orders of the group. In various embodiments, the machine learned cost model estimates the amount of time for the shopper to retrieve items from a warehouse 110 identified by an order of the group based on a number of items in the order, characteristics of items in the order, a time during which the items of the order are obtained from the warehouse 110, historical times to obtain items from the warehouse 110, and any other suitable criteria. Similarly, the machine learned cost model estimates the distance travelled to fulfill orders of the group (e.g., distances between warehouses 110 identified by orders in the group, distances between one or more warehouses 110 identified by orders of the group and locations identified by orders of the group) based on locations of warehouses included in the orders of the group and locations identified by orders of the group. The machine learned cost model may be trained using any suitable method or combination of methods (e.g., supervised learning, unsupervised learning, semi-supervised learning, etc.) in various embodiments. As further described below in conjunction with FIG. 6, the order fulfillment engine 206 selects a group having a minimum cost for fulfillment, allowing shoppers available during multiple discrete time intervals to select the group for fulfillment, increasing a number of shoppers capable of fulfilling the group of orders while combining orders to conserve resources for fulfilling the group of orders.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 maintains a trained purchase model, further described below in conjunction with FIG. 6. The trained purchase model receives inputs an identifier of the user, an identifier of an item, and a time. and outputs a probability of the user corresponding to the identifier of the user purchasing an item corresponding to the identifier of the item at the time. The trained purchase model accounts for times when the user previously purchased an item, such as a relative time from when the user previously purchased the item to a time when the model is applied, as well as characteristics of the item (e.g., a type of the item, a quantity or an amount of the item that was previously purchased). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user. The trained purchase model may be trained using any suitable method or combination of methods (e.g., supervised learning, unsupervised learning, semi-supervised learning, etc.).

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
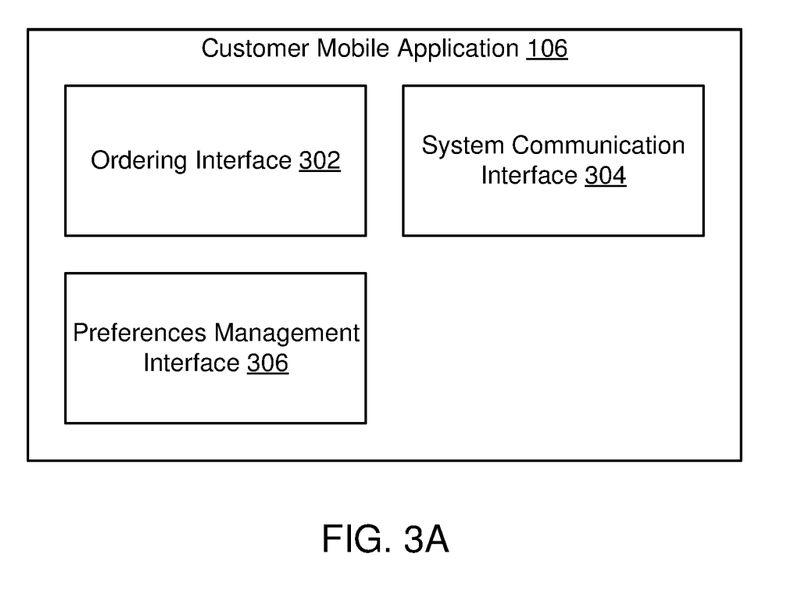
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
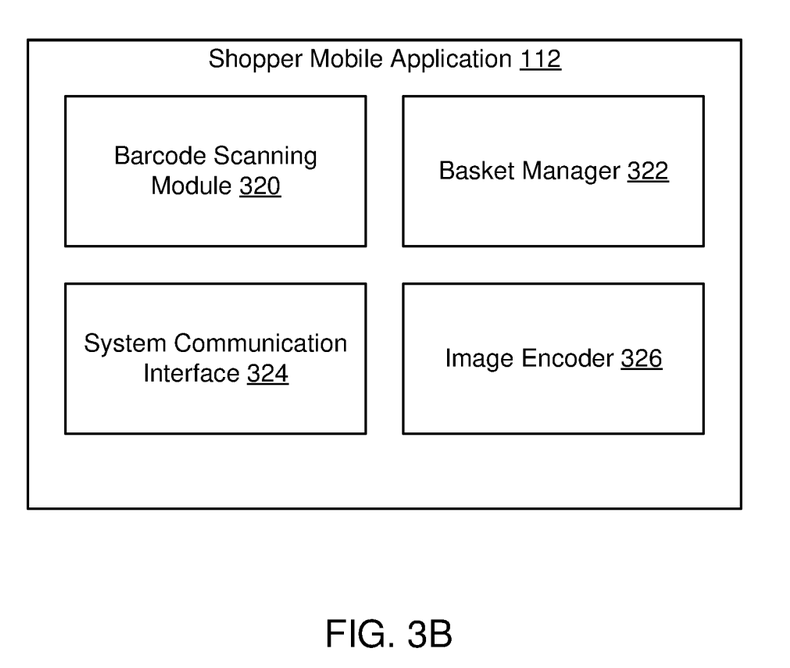
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
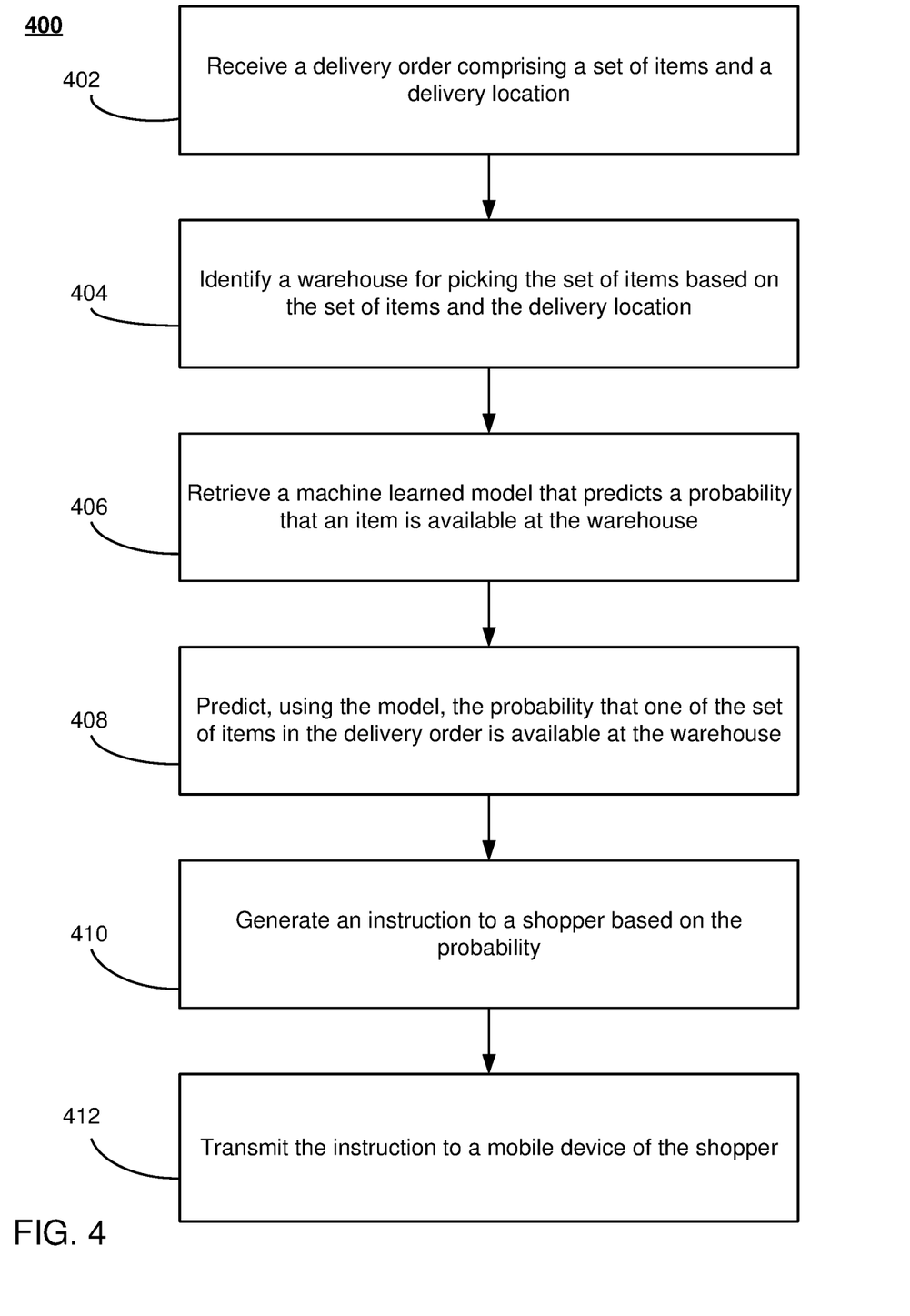
FIG. 4 is a flowchart of a process for predicting inventory availability, according to one embodiment.

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. Other examples of the shopper management engine 210 instruction to the shopper are described in further detail with reference to FIGS. 5 and 6. In some other examples, the order fulfillment engine 206 sends a message and/or instruction to a user based on the probability predicted by the machine-learned item availability model 216.

Figure 5:
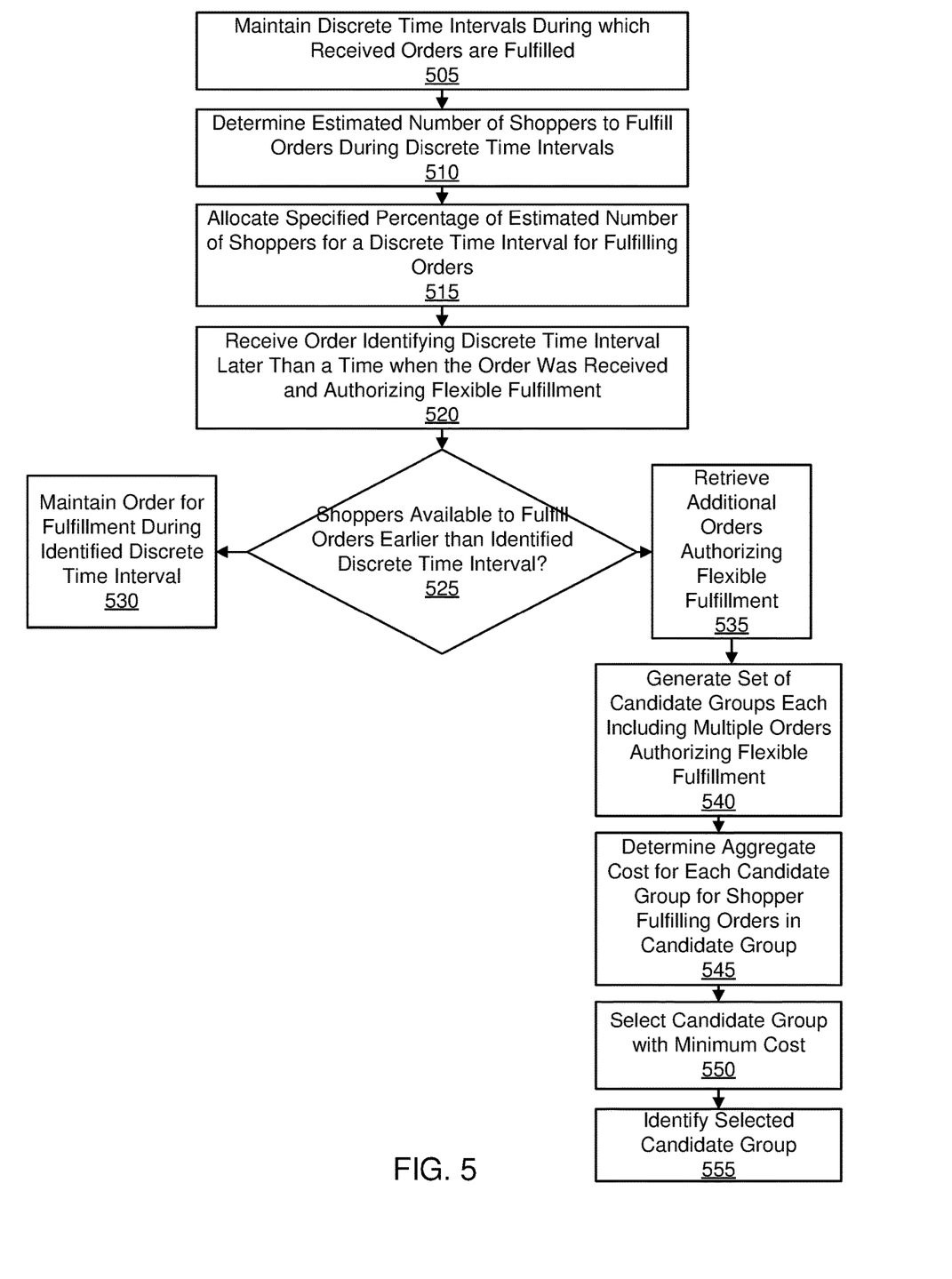
FIG. 5 is a flowchart of a method for grouping orders received by an online concierge system for fulfillment by shoppers, according to one embodiment.

Grouping of Received Orders Accounting for Orders Specifying Different Time Windows FIG. 5 is a flowchart of one embodiment of a method for grouping orders received by an online concierge system 102 for fulfillment by shoppers. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

An online concierge system 102 maintains 505 a plurality of discrete time intervals during which orders received by the online concierge system are fulfilled. For example, the online concierge system 102 maintains 505 multiple two hour intervals for fulfilling orders. As an example, the online concierge system 102 partitions a day into discrete two hour intervals for fulfilling orders. This allows a user of the online concierge system 102 to select a discrete time interval for an order provided by the user so items included in the order are delivered to the user at a time within the selected discrete time interval. By selecting a discrete time interval, a user of the online concierge system 102 is able to schedule delivery of items in the order at a future time within the selected discrete time interval, allowing the user to tailor when the order is fulfilled. In some embodiments, the online concierge system 102 maintains a maximum interval and allows a user to select a discrete time interval that is within the maximum interval from a time when the order is received by the online concierge system 102 to limit how long in the future the user may schedule fulfillment of the order.

From previously fulfilled orders, the online concierge system 102 determines 510 an estimated number of shoppers available to fulfill orders during each of at least a set of the discrete time intervals. For example, the online concierge system 102 determines 510 an estimated number of shoppers available to fulfill orders during each of the discrete time intervals. In various embodiments, the online concierge system 102 applies a trained machine learned model to historical numbers of shoppers available to fulfill orders, or who fulfilled orders, at different discrete time intervals and characteristics of the discrete time interval (e.g., weekday or weekend, time of day, day of the week, day of the month, etc.), as well as a geographic location. To determine 510 the estimated number of shoppers, the trained machine learned model receives a discrete time interval and a geographic location and determines 510 the estimated number of shoppers available to fulfill orders during the discrete time interval based on historical numbers of shoppers available during prior time intervals corresponding to the discrete time interval, as well as the geographic location. The trained machine learned model for determining 510 the estimated number of shoppers during a discrete time interval may be trained using any suitable method or combination of methods (e.g., supervised learning, unsupervised learning, semi-supervised learning, etc.). In various embodiments, the online concierge system 102 determines 510 an estimated number of shoppers available to fulfill orders during each discrete time interval of a set. For example, the set of discrete time intervals includes each discrete time interval within the maximum interval from a current time.

The online concierge system 102 maintains a specified percentage of shoppers to allocate per discrete time interval for fulfilling orders. Based on the specified percentage, the online concierge system 102 allocates 515 the specified percentage of estimated shoppers for a discrete time interval for fulfilling orders specifying the discrete time interval. The specified percentage of estimated shoppers for a discrete time interval for fulfilling orders specifying the discrete time interval is less than 100%, with the remaining percentage of the estimated shoppers for the discrete time interval are allocated by the online concierge system 102 for fulfilling orders received during the discrete time interval and indicating short term fulfillment (i.e., fulfillment within a threshold amount of time from a time when the order was received). This allocation allows the online concierge system 102 to divide the number of estimated shoppers during the discrete time interval between orders received before the discrete time interval that specify fulfillment during the discrete time interval and orders received during the discrete time interval identifying short term fulfillment for fulfillment. In some embodiments, the specified percentage is constant for different discrete time intervals. For example, the specified percentage is 70%, so the online concierge system 102 allocates 70% of the estimated number of shoppers for the discrete time interval to fulfill orders received before the discrete time interval that specify fulfillment during the discrete time interval and allocates 30% of the estimated number of shoppers for the discrete time interval to fulfill orders indicating short term fulfillment and received during the discrete time interval. In other embodiments, the online concierge system 102 maintains different specified percentage for different discrete time intervals; for example, the online concierge system 102 maintains a specified percentage for discrete time intervals occurring within a portion of a day (e.g., a morning) and a different specified percentage for discrete time intervals occurring within a different portion of the day (e.g., an afternoon).

This allocation of estimated shoppers for fulfilling orders during discrete time intervals between orders received before a discrete time interval and specifying the discrete time interval and orders received during the discrete time interval allows the online concierge system 102 to maintain a buffer of estimated shoppers for fulfilling orders received to during the discrete time interval or to account for increases in orders identifying the discrete time interval for fulfillment. However, when numbers of orders increase, because the specified percentage is less than 100% of the estimated shoppers for fulfilling orders during different discrete time intervals, discrete time intervals capable of being specified by orders from users decrease, making scheduling of order fulfillment difficult for users. Further, increasing numbers of orders may increase a number of orders received during a discrete time interval, quickly occupying remaining shoppers for fulfilling orders received during the discrete time interval. This may cause intermittent availability of users to place orders to be fulfilled within the maximum interval from the time when the online concierge system 102 receives the orders.

To improve order fulfillment, the online concierge system 102 allows a user to include a flag in an order authorizing flexible fulfillment of the order. Including the flag in the order authorizes the online concierge system 102 to deliver items included in the order at any time prior to a discrete time interval identified by the order. Hence, the flag allows the user to identify a discrete time interval, while allowing the online concierge system 102 to fulfill and deliver items in the order during other discrete time intervals that are earlier than the discrete time interval. This causes the discrete time interval identified by the order to specify a latest time interval for delivery of items included in the order. In alternative embodiments, the flag authorizing flexible fulfillment of the order authorizes the online concierge system to deliver items included in the order during an extended discrete time interval that is longer than the discrete time interval, allowing items in the order to be fulfilled during a longer period of time than the discrete time interval.

When the online concierge system 102 receives 520 an order from a user that identifies a discrete time interval that is later than a time when the order was received 520 and that includes the flag authorizing flexible fulfillment of the order, the online concierge system 102 determines 525 whether one or more shoppers are available to fulfill orders during one or more discrete time intervals that are earlier than the discrete time interval identified by the order. In response to determining shoppers are not available to fulfill orders during the one or more discrete time intervals that are earlier than the discrete time interval identified by the order, the online concierge system 102 maintains 530 the order for fulfillment at the discrete time interval identified by the order. Hence, without shoppers available to fulfill the order during earlier discrete time intervals, the order is fulfilled, and its items delivered to the user during the discrete time interval identified by the order.

However, responsive to determining 525 one or more shoppers are available to fulfill orders during one or more discrete time intervals earlier than the discrete time interval identified by the order, the online concierge system 102 evaluates the order including the flag authorizing flexible fulfillment and other orders with the flag authorizing flexible fulfillment. The online concierge system 102 retrieves 535 additional orders received by the online concierge system 102 that also include the flag authorizing flexible fulfillment. When retrieving 535 additional orders including the flag authorizing flexible fulfillment, the online concierge system 102 limits retrieval to additional orders including the flag authorizing flexible fulfillment satisfying one or more criteria in some embodiments. For example, the online concierge system 102 retrieves 535 additional orders including the flag authorizing flexible fulfillment identifying locations within a threshold distance of the location identified by the received order including the flag authorizing flexible fulfillment. In some embodiments, the online concierge system 102 maintains regions including multiple geographic locations, so the online concierge system 102 retrieves 535 additional orders including the flag authorizing flexible fulfillment including locations within a region including a geographic location included in the received order including the flag authorizing flexible fulfillment. As another example, the online concierge system 102 also accounts for discrete time intervals identified by additional orders including the flag authorizing flexible fulfillment by retrieving 535 additional orders including the flag authorizing flexible fulfillment that identify discrete time intervals not later than the discrete time interval identified by the received order including the flag authorizing flexible fulfillment. Hence, in some embodiments, the online concierge system 102 retrieves 535 additional orders including the flag authorizing flexible fulfillment that identify discrete time intervals not later than the discrete time interval identified by the received order including the flag authorizing flexible fulfillment as well as that identify geographic locations within a threshold distance of geographic location identified by the received order including the flag authorizing flexible fulfillment (or including geographic locations within a common region of geographic locations as the received order including the flag authorizing flexible fulfillment). In other embodiments, the online concierge system 102 retrieves 535 additional orders including the flag authorizing flexible fulfillment using any suitable criteria.

From the order including the flag authorizing flexible fulfillment and the one or more additional orders including the flag authorizing flexible fulfillment, the online concierge system 102 generates 540 a set of candidate groups each including different combinations of the order including the flag authorizing flexible fulfillment and the one or more additional orders including the flag authorizing flexible fulfillment. In some embodiments, the set includes each potential combination of the order including the flag authorizing flexible fulfillment and the one or more additional orders including the flag authorizing flexible fulfillment. In some embodiments, the online concierge system 102 generates 540 the set of candidate groups so candidate groups satisfy one or more constraints maintained by the online concierge system 102. For example, the online concierge system 102 may limit combinations of the received order including the flag authorizing flexible fulfillment and additional orders including the flag authorizing flexible fulfillment to combinations including less than a threshold number of orders. As another example, the online concierge system 102 limits combinations of the received order including the flag authorizing flexible fulfillment and additional orders including the flag authorizing flexible fulfillment to combinations where a total number of items in orders included in a combination is less than a maximum number of items. In other implementations, the online concierge system 102 associates a type with orders, and limits combinations of the received order including the flag authorizing flexible fulfillment and additional orders including the flag authorizing flexible fulfillment to combinations including orders have a common type or including one or more specific combinations of types.

For each candidate group, the online concierge system 102 determines 545 a cost for a shopper fulfilling orders included in a candidate group. The online concierge system 102 applies a machine learned cost model to a candidate group to determine 545 a cost for fulfilling orders in the candidate group based on locations identified by orders in the candidate group and items included in orders in the candidate group. The machine learned cost model outputs a cost accounting for an estimated distance (e.g., an estimated mileage) for a shopper to travel to fulfill the orders in the candidate group and an estimated amount of time for the shopper to retrieve items from one or more warehouses 110 identified by orders of the group. The machine learned cost model estimates the amount of time for the shopper to retrieve items from a warehouse 110 identified by an order of the group based on a number of items in the order, characteristics of items in the order, a time during which the items of the order are obtained from the warehouse 110, historical times to obtain items from the warehouse 110, and any other suitable criteria. Similarly, the machine learned cost model estimates the distance travelled to fulfill orders of the candidate group (e.g., distances between warehouses 110 identified by orders in the group, distances between one or more warehouses 110 identified by orders of the group and locations identified by orders of the group) based on locations of warehouses included in the orders of the candidate groups and locations identified by orders of the candidate group. In some embodiments, the machine learned cost model determines a time to deliver orders of the candidate group based on locations of warehouses included in the orders of the candidate groups, locations identified by orders of the candidate group, a time when the orders of the candidate group are to be delivered, prior times to deliver orders from the warehouses included in the orders to locations within a threshold distance of the locations identified by orders of the candidate group, prior times to travel between warehouses 110 identified by orders of the group, and may account for traffic conditions at the time when the orders of the candidate group are to be delivered, as well as any other suitable criteria. The machine learned cost model may be applied to individual orders in a candidate group, with the cost of the candidate group determined by combining the costs for orders in the candidate group. Alternatively, the machine learned cost model is applied to the candidate group as a whole. The machine learned cost model may be trained using any suitable method or combination of methods (e.g., supervised learning, unsupervised learning, semi-supervised learning, etc.) in various embodiments.

As the costs determined 545 for each candidate group account for time to fulfill orders of the candidate group and distance traveled to fulfill orders of the candidate group, the online concierge system 102 selects 550 a candidate group of the set having a minimum cost. This allows the online concierge system 102 to identify a group of orders for a shopper to fulfill having the lowest overall cost to fulfill as a group. Accounting for orders including the flag specifying flexible fulfillment that specify different discrete time intervals before the time interval identified by the received order including the flag specifying flexible fulfillment allows the online concierge system 102 to consider a broader range of orders for inclusion in a group, increasing an ability of the online concierge system 102 to combine orders into a group. This provides the online concierge system 102 with greater opportunities to combine orders for fulfillment as a group to conserve resources for order fulfillment, while providing users with greater opportunities for order fulfillment.

While FIG. 5 describes a configuration where the online concierge system 102 selecting 550 a candidate group based on costs for fulfilling different candidate groups, in other embodiments, the online concierge system 102 selects 550 a candidate group based on any suitable metric. In some embodiments, the online concierge system 102 generates a metric describing fulfillment or different candidate groups and selects 550 a candidate group that optimizes the metric. For example, the online concierge system 102 determines a total distance for a shopper to travel to fulfill orders in each candidate group and selects 550 a candidate group having a minimum total distance. As another example, the online concierge system 102 determines a total time for a shopper to travel to fulfill orders in each candidate group and selects 550 a candidate group having a minimum total time. However, in other embodiments, the online concierge system 102 generates any suitable metric describing fulfillment of different candidate groups. The online concierge system 102 may train a machine learned model using any suitable method or combination of methods (e.g., supervised learning, unsupervised learning, semi-supervised learning, etc.) in various embodiments to determine the metric for different candidate groups based on characteristics of orders in the candidate groups or any other suitable information.

In some embodiments, the online concierge system 102 also accounts for predicted availability of items included in orders of candidate groups. Based on application of the machine-learned item availability model further described above in conjunction with FIGS. 2 and 4 to items included in orders identifying warehouses 110 and identifying different discrete time intervals, the online concierge system 102 determines predicted availabilities of different items at different warehouses 110 during different discrete time intervals, allowing the online concierge system 102 to maintain information describing predicted availabilities of different items at a warehouse 110 during different discrete time intervals. Based on the information describing predicted availabilities of different items at a warehouse 110 during different discrete time intervals the online concierge system 102 determines a discrete time interval where a warehouse 110 has less than a threshold average predicted availability for items, allowing the online concierge system 102 to account for predicted availabilities of items in orders of a candidate group at different discrete time intervals when selecting 550 a candidate group. For example, the online concierge system 102 does not select a candidate group including an order identifying a warehouse 110 and identifying a discrete time interval where the identified warehouse 110 has less than a threshold average predicted availability for items in the order.

The online concierge system 102 identifies 555 the selected candidate group of the set to one or more shoppers, allowing a shopper to select the selected candidate group of orders for fulfillment. For example, the online concierge system 102 includes the selected candidate group in an interface of the shopper mobile application 112 transmitted to client devices of shoppers. For example, the online concierge system 102 identifies a number of orders included in the selected candidate group and an identifier of the selected candidate group in the interface of the shopper mobile application 112. The online concierge system 102 may include additional information in the interface, such as the warehouses 110 identified by orders of the selected candidate group, a total distance to travel to fulfill orders of the selected candidate group, or any other suitable information. When a shopper selects the selected candidate group via the shopper mobile application 112, the shopper fulfills all of the orders included in the selected candidate group.

Figure 6:
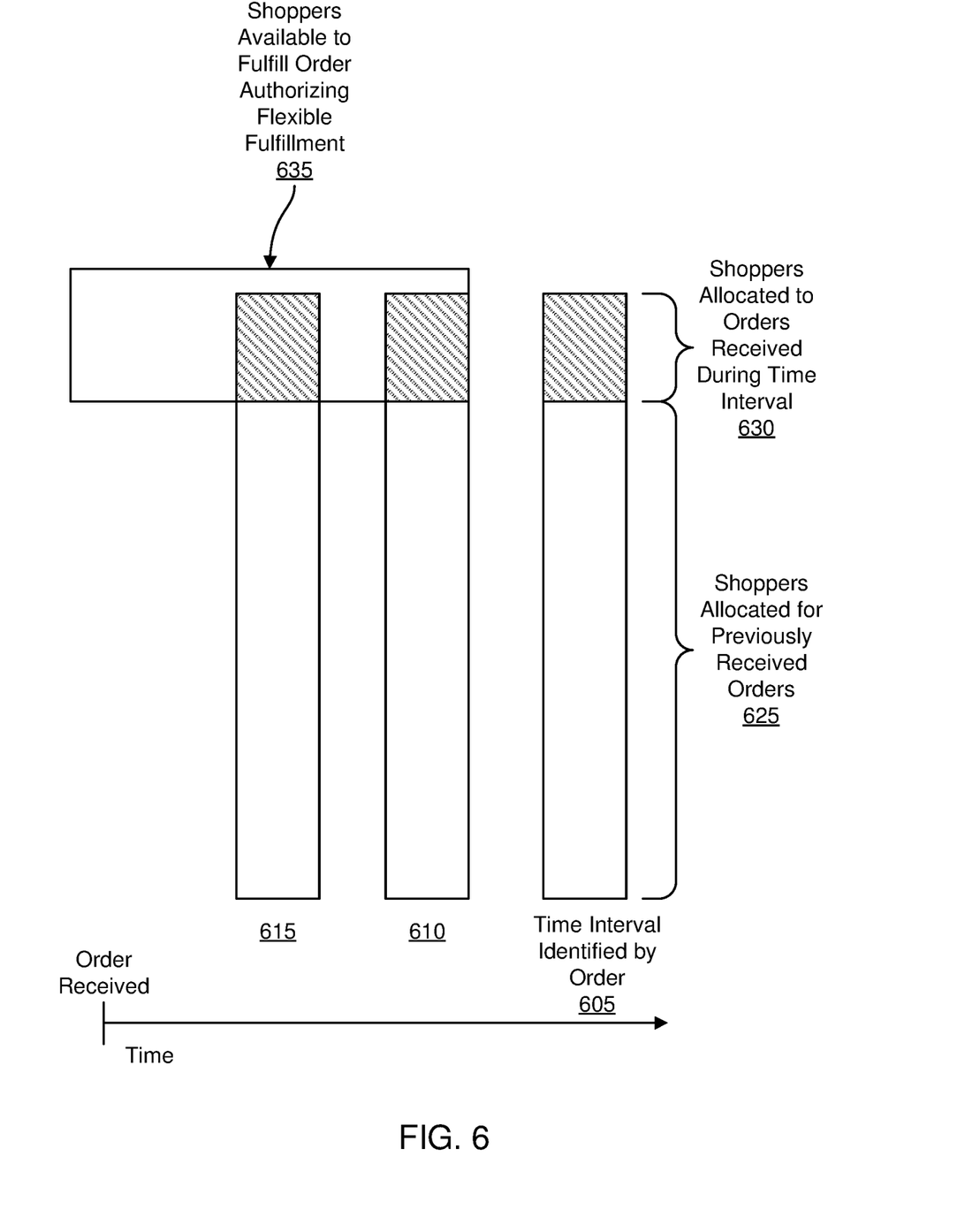
FIG. 6 is an example conceptual diagram of an online concierge system indicating allocation of shoppers for fulfilling orders authorizing flexible fulfillment, according to one embodiment.

FIG. 6 is an example conceptual diagram of an online concierge system 102 indicating allocation of shoppers for fulfilling orders authorizing flexible fulfillment. In the example of FIG. 6, an order received by the online concierge system 102 identifies a discrete time interval 605 that is later than a time when the order was received and that includes the flag authorizing flexible fulfillment of the order. For purposes of illustration, FIG. 6 shows two additional discrete time intervals 610, 615 occurring between a time 620 when the order was received by the online concierge system 102 and the discrete time interval 605 identified by the order. However, any number of discrete time intervals may occur between the time 620 when the order was received and the discrete time interval identified by the order.

Because the received order includes the flag authorizing flexible fulfillment, the order may be fulfilled at any time prior to the discrete time interval 605 identified by the order but is fulfilled no later than the discrete time interval 605 identified by the order. Hence, the order may be fulfilled by delivering its constituent items to the user during additional time interval 610 or during additional time interval 615. As further described above in conjunction with FIG. 5, the online concierge system 102 allocates a specified percentage of shoppers 625 or estimated shoppers available during a discrete time interval for fulfilling orders received before the discrete time interval and identifying the discrete time interval. For example, the online concierge system 102 allocates 70% of shoppers 625 available during discrete time interval 605 (and 70% of shoppers estimated to be available during discrete time interval 605) for fulfilling orders that identify discrete time interval 605 and were received before discrete time interval 605. The remaining shoppers 630 available during a discrete time interval or estimated to be available during a discrete time interval are allocated to fulfilling orders received during the describe time interval and indicating short term fulfillment. Referring back to the previous example, the remaining 30% of shoppers 630 available during discrete time interval 605 (and 70% of shoppers estimated to be available during discrete time interval 605) for fulfilling orders received during discrete time interval 605 indicating short term fulfillment.

This allocation of shoppers for fulfilling orders received at different times and identifying different discrete time intervals for fulfillment becomes strained as orders increase because fewer than all available shoppers during a discrete time interval are allocated for fulfilling received orders identifying the discrete time interval. To increase a number of shoppers available for fulfilling orders, an order including the flag authorizing flexible fulfillment allows shoppers not allocated to fulfilling orders identifying earlier discrete time intervals to fulfill the order at a time earlier than the discrete time interval identified by the order. In the example of FIG. 6, because the order includes the flag authorizing flexible fulfillment, shoppers 630 allocated to fulfilling orders received during time intervals 610 and 615 indicating short term fulfillment may select the order and fulfill the order during time intervals 610 and 615. For example, when 30% of shoppers 630 available during time intervals are allocated to fulfilling orders received during a time interval indicating short term fulfillment, 30% of shoppers 630 available during time interval 610, as well as 30% of shoppers available during time interval 615, in addition to the 70% of the shoppers available during time interval 605, which was identified by the order, are capable of selecting and fulfilling the order. This provides the online concierge system 102 with a greater number of shoppers to fulfill the order. As further described above in conjunction with FIG. 5, the online concierge system 102 may group orders including the flag authorizing flexible fulfillment and indicating fulfillment during discrete time interval 610 or 615 along with the order including the flag authorizing flexible fulfillment identifying discrete time interval 605, allowing a shopper to select the group to fulfill multiple orders at once to more efficiently allocate shoppers and reduce costs and resources expended for fulfilling multiple orders.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   maintaining, at an online concierge system, a plurality of discrete time intervals for fulfilling orders received by the online concierge system, the orders comprising (1) a first type of orders, each of which is to be delivered in a discrete time interval that is later than a discrete time interval in which the order is received, (2) a second type of orders, each of which is to be delivered in a same discrete time interval in which the order is received, and (3) a third type of orders, each of which is to be delivered in a discrete time interval, or any time before the discrete time interval;
   applying a machine learning model to determine an estimated number of shoppers available to fulfill orders during each of the discrete time intervals by the online concierge system, wherein the machine learning model is trained using data including historical numbers of shoppers available to fulfill orders at different discrete time intervals;
   for each time interval, allocating a specified percentage of estimated shoppers for a discrete time interval for fulfilling orders of the first type and allocating a remaining percentage of the estimated shoppers for the discrete time interval for fulfilling orders of the second type;
   receiving an order of the third type from a user of the online concierge system;
   responsive to the online concierge system determining one or more shoppers are available to fulfill orders during one or more discrete time intervals earlier than the discrete time interval identified by the order,
   retrieving additional orders of the third type received by the online concierge system;
   generating a set of candidate groups including one or more additional orders and the received order,
   determining a cost of fulfilling each candidate group of the set, the cost of a candidate group based on locations identified in the received order and in the one or more additional orders of the candidate group and items included in the received order and in the one or more additional orders,
selecting a candidate group of the set having a minimum cost; and
identifying the selected candidate group of the set to the one or more shoppers available to fulfill orders during one or more discrete time intervals earlier than the discrete time interval identified by the order for selection.

2. The method of claim 1, wherein
each order of the third type includes a flag authorizing delivery of items at any time prior to the discrete time interval identified by the additional order, and each order of the third type identifies a discrete time interval not later than the discrete time interval identified by the received order.

3. The method of claim 1, wherein
each order of the third type includes a flag authorizing delivery of items at any time prior to the discrete time interval identified by the additional order, and each identifies a location within a threshold distance of a location identified by the received order.

4. The method of claim 1, wherein
each order of the third type includes a flag authorizing delivery of items at any time prior to the discrete time interval identified by the additional order, and identifies a location within a common region maintained by the online concierge system as a location identified by the received order.

5. The method of claim 1, wherein
each order of the third type includes a flag authorizing delivery of items at any time prior to the discrete time interval identified by the additional order, identifies a location within a common region maintained by the online concierge system as a location identified by the received order, and identifies a discrete time interval not later than the discrete time interval identified by the received order.

6. The method of claim 1, wherein generating the set of candidate groups including one or more additional orders and the received order comprises:
generating the set of candidate groups so a total of one or more additional orders and the received order in each candidate group is less than a threshold number of orders.

7. The method of claim 1, wherein generating the set of candidate groups including one or more additional orders and the received order comprises:
generating the set of candidate groups so a total of items included in one or more additional orders and items included in the received order in each candidate group is less than a maximum number of items.

8. The method of claim 1, wherein generating the set of candidate groups including one or more additional orders and the received order comprises:
generating the set of candidate groups so a type of one or more additional orders and a type of the received order comprise a specific combination of types.

9. The method of claim 1, wherein the cost of a candidate group accounts for an estimated distance for a shopper to travel to fulfill the received order and the one or more additional orders of the candidate group and an estimated amount of time for the shopper to retrieve items identified by the received order and the one or more additional orders of the candidate group from one or more warehouses.

10. The method of claim 9, wherein the estimated distance accounts for an amount of time to travel to warehouses identified by the received order and the one or more additional orders of the candidate group and to deliver items to locations identified by the received order and the one or more additional orders of the candidate group.

11. A computer program product comprising a non-transitory computer readable storage medium having instructions encoded thereon that, when executed by a processor, cause the processor to:
maintain, at an online concierge system, a plurality of discrete time intervals for fulfilling orders received by the online concierge system, the orders comprising (1) a first type of orders, each of which is to be delivered in a discrete time interval that is later than a discrete time interval in which the order is received, (2) a second type of orders, each of which is to be delivered in a same discrete time interval in which the order is received, and (3) a third type of orders, each of which is to be delivered in a discrete time interval, or any time before the discrete time interval;
apply a machine learning model to determine an estimated number of shoppers available to fulfill orders during each of the discrete time intervals by the online concierge system, wherein the machine learning model is trained using data including historical numbers of shoppers available to fulfill orders at different discrete time intervals;
for each time interval, allocate a specified percentage of estimated shoppers for a discrete time interval for fulfilling orders of the first type and allocating a remaining percentage of the estimated shoppers for the discrete time interval for fulfilling orders of the second type;
receive an order of the third type from a user of the online concierge system;
responsive to the online concierge system determining one or more shoppers are available to fulfill orders during one or more discrete time intervals earlier than the discrete time interval identified by the order,
retrieve additional orders of the third type received by the online concierge system;
generate a set of candidate groups including one or more additional orders and the received order,
determine a cost of fulfilling each candidate group of the set, the cost of a candidate group based on locations identified in the received order and in the one or more additional orders of the candidate group and items included in the received order and in the one or more additional orders,
select a candidate group of the set having a minimum cost; and
identify the selected candidate group of the set to the one or more shoppers available to fulfill orders during one or more discrete time intervals earlier than the discrete time interval identified by the order for selection.

12. The computer program product of claim 11, wherein
each order of the third type includes flag authorizing delivery of items at any time prior to the discrete time interval identified by the additional order and each identifies a discrete time interval not later than the discrete time interval identified by the received order.

13. The computer program product of claim 11, wherein
each order of the third type includes flag authorizing delivery of items at any time prior to the discrete time interval identified by the additional order and identifies a location within a threshold distance of a location identified by the received order.

14. The computer program product of claim 11, wherein each order of the third type includes flag authorizing delivery of items at any time prior to the discrete time interval identified by the additional order and identifies a location within a common region maintained by the online concierge system as a location identified by the received order.

15. The computer program product of claim 11, wherein each order of the third type includes flag authorizing delivery of items at any time prior to the discrete time interval identified by the additional order, identifies a location within a common region maintained by the online concierge system as a location identified by the received order, and identifies a discrete time interval not later than the discrete time interval identified by the received order.

16. The computer program product of claim 11, wherein generate the set of candidate groups including one or more additional orders and the received order comprises:
    generate the set of candidate groups so a total of one or more additional orders and the received order in each candidate group is less than a threshold number of orders.

17. The computer program product of claim 11, wherein generate the set of candidate groups including one or more additional orders and the received order comprises:
    generate the set of candidate groups so a total of items included in one or more additional orders and items included in the received order in each candidate group is less than a maximum number of items.

18. The computer program product of claim 11, wherein generate the set of candidate groups including one or more additional orders and the received order comprises:
    generate the set of candidate groups so a type of one or more additional orders and a type of the received order comprise a specific combination of types.

19. The computer program product of claim 11, wherein the cost of a candidate group accounts for an estimated distance for a shopper to travel to fulfill the received order and the one or more additional orders of the candidate group and an estimated amount of time for the shopper to retrieve items identified by the received order and the one or more additional orders of the candidate group from one or more warehouses.

20. The computer program product of claim 19, wherein the estimated distance accounts for an amount of time to travel to warehouses identified by the received order and the one or more additional orders of the candidate group and to deliver items to locations identified by the received order and the one or more additional orders of the candidate group.

21. A method comprising:
    maintaining, at an online concierge system, a plurality of discrete time intervals for fulfilling orders received by the online concierge system, the orders comprising (1) a first type of orders, each of which is to be delivered in a discrete time interval that is later than a discrete time interval in which the order is received, (2) a second type of orders, each of which is to be delivered in a same discrete time interval in which the order is received, and (3) a third type of orders, each of which is to be delivered in a discrete time interval, or any time before the discrete time interval;
    applying a machine learning model to determine an estimated number of shoppers available to fulfill orders during each of the discrete time intervals by the online concierge system, wherein the machine learning model is trained using data including historical numbers of shoppers available to fulfill orders at different discrete time intervals;
    for each time interval, allocating a specified percentage of estimated shoppers for a discrete time interval for fulfilling orders of the first type and allocating a remaining percentage of the estimated shoppers for the discrete time interval for fulfilling orders of the second type;
    receiving an order of the third type from a user of the online concierge system;
    responsive to the online concierge system determining one or more shoppers are available to fulfill orders during one or more discrete time intervals earlier than the discrete time interval identified by the order,
        retrieving additional orders of the third type received by the online concierge system;
        generating a set of candidate groups including one or more additional orders and the received order,
        determining metric for fulfilling each candidate group of the set, the metric or fulfilling a candidate group based on characteristics of the order and the one or more additional orders of the candidate group,
        selecting a candidate group of the set optimizing the metric and
    identifying the selected candidate group of the set to the one or more shoppers available to fulfill orders during one or more discrete time intervals earlier than the discrete time interval identified by the order for selection.

\* \* \* \* \*